(12) United States Patent
Agarwal

(10) Patent No.: US 7,565,539 B2
(45) Date of Patent: Jul. 21, 2009

(54) METHOD AND APPARATUS FOR SECURE COMMUNICATIONS

(75) Inventor: Anil Agarwal, North Potomac, MD (US)

(73) Assignee: Viasat Inc., Carlsbad, CA (US)

( * ) Notice: Subject to any disclaimer, the term of this patent is extended or adjusted under 35 U.S.C. 154(b) by 384 days.

(21) Appl. No.: 11/478,639

(22) Filed: Jul. 3, 2006

(65) Prior Publication Data

US 2008/0005564 A1 Jan. 3, 2008

(51) Int. Cl.
*H04L 9/14* (2006.01)
(52) U.S. Cl. .................. 713/171; 380/44; 380/277; 380/278; 713/150; 713/168
(58) Field of Classification Search ............... 713/150, 713/168, 171; 380/277, 278, 44
See application file for complete search history.

(56) References Cited

U.S. PATENT DOCUMENTS

| | | | |
|---|---|---|---|
| 7,103,185 B1* | 9/2006 | Srivastava et al. | 380/277 |
| 7,353,380 B2* | 4/2008 | VanHeyningen | 713/150 |
| 2001/0050990 A1* | 12/2001 | Sudia | 380/286 |
| 2004/0073796 A1* | 4/2004 | Kang et al. | 713/171 |
| 2005/0175184 A1* | 8/2005 | Grover et al. | 380/278 |
| 2005/0210252 A1* | 9/2005 | Freeman et al. | 713/171 |
| 2006/0023750 A1* | 2/2006 | Kim et al. | 370/473 |

OTHER PUBLICATIONS

International Search Report, dated Sep. 8, 2008.

* cited by examiner

*Primary Examiner*—Andrew L Nalven
*Assistant Examiner*—Yin-Chen Shaw
(74) *Attorney, Agent, or Firm*—Sughrue Mion, PLLC

(57) ABSTRACT

A method of managing a key for encrypted communication over a communication link between first and second modems, each modem having respective first and second master keys. A first key material for the first modem is transmitted to the second modem in an encrypted message using the first master key, via a time divided frame over the link. Upon receipt, a second key material is generated at the second modem and is sent to the first modem. Then, at each of the first and second modems, session keys are generated based on the key materials, preferably using a hashing algorithm. An encryptor at the first modem and a decryptor at the second modem are programmed with an identified key and a session key. Encryption is enabled at the first modem and information is transmitted in encrypted frames using the identified key. The second modem receives and decrypts the encrypted frames when frames with the identified key are received.

16 Claims, 11 Drawing Sheets

METHOD AND APPARATUS FOR SECURE COMMUNICATIONS

BACKGROUND OF THE INVENTION

1. Field of the Invention

The present invention concerns communication systems that exchange data via wired or wireless links, using modems at different communicating locations. In particular, the invention concerns a method and apparatus for providing communication security for data exchange between modems engaged in point-to-point or point-to-multipoint communications in bidirectional or unidirectional modes. The invention in particularly adapted to provide secure communications in a mobile environment where any of a variety of modulation and encoding techniques, and encryption algorithms, may be used.

2. Description of the Related Art

Conventional communications over wired and wireless links, including satellite links, are provided at high speeds with the use of a variety of modulation and encoding techniques. However, such communications are subject to intrusion and detection of their content. Broadcasts over the air, even at high speeds, can easily be detected with conventional reception equipment, and even communications over wire can be inductively detected in well known ways. Ordinarily, the data being transmitted, which may be voice, video or data, may contain sensitive information that the originators wish to have protected against unauthorized access. In order to protect the information, encryption techniques are known to be used. Currently, encryption may be provided using commercial encryption standards, such as those that rely upon the standard AES algorithms, including the current AES-128 standard techniques. Implementation of such techniques requires the establishment of a "key" at each of the communicating locations and the exchange of such keys in a secure manner so that only authorized access to the transmitted data can be assured. Data is encrypted using the key and, typically, decrypted using the same key, though different keys may be used as is known in the art. Key generation and exchange must be effectively implemented. Moreover, in order to enhance security, the key must be changed periodically, requiring a rollover of the keys in order to protect against intrusion and attack on the security of the system. Well-known ways to-perform key exchange and authentication include those based on Diffie-Hellman, elliptical curve cryptography and RSA. As part of the key generation and exchange process, the modems must be authenticated.

However, the encryption process adds additional overhead to the transmission, thereby rendering the communication less efficient and incurring higher costs. Moreover, in an environment which is subject to link outages, such as wireless mobile communications or satellite communications, interruption of the communication requires reestablishment of the encryption parameters between communicating modems, which may involve additional inefficiencies. Where an outage is experienced and bit errors and data loss occurs, resynchronization requires manual procedures or automated techniques that require a significant amount of time to detect loss of crypto sync, exchange messages and re-initialize the crypto states. Further, global time synchronization may be required to serve as seeds in encryption operations or to help in synchronizing changes in keys.

In a conventional system, communication includes both data carried over a user channel as well as overhead information carried on a separate overhead channel. This is true for both bidirectional and one-way links as well as fixed and mobile networks. Transmissions may be in burst or continuous form. Typically, the overhead and data information are multiplexed and transmitted in encrypted form using the encryption algorithm. However, the communication of encryption information is conducted out of band. In addition, there is a need for external key management, including key generation, distribution and rollover.

The complexity of a system having multiple modems is increased where all communications among the modems must be encrypted. Moreover, when encryption keys are to be exchanged, on a session basis, added inefficiencies will arise.

Further, since encryption information is sent out of band on a separate channel, this information remains vulnerable to attack since its communication is not itself encrypted.

Accordingly, there is a need to have a secure modem design that is effective in providing communications security for data exchanged between two modems, involves low overhead, and uses standard algorithms, but nonetheless, is robust against bit errors and link outages, particularly in mobile and wireless applications. Further, there is a need to provide a system using secure modems that provides mutual identification and authentication, as well as automated, over the air dynamic encryption key generation, exchange and rollover.

SUMMARY OF THE INVENTION

A method of establishing a key for encrypted communication over a communication link between a first and a second modem, where each modem has a respective first and second master key. In first exchanging a key, frame encryption is disabled and a key identifier ("key Id"), which represents a respective one of several encryption keys, is set to a first value. Then, a first key material is generated for the first modem and a message that is encrypted using the first master key is transmitted from the first modem to the second modem via an encrypted frame over the link, the message comprising the first key material. At the second modem, the first key material is received and a second key material is generated. Then, session keys are generated at each of said first and second modems, based on the respective session keys and, preferably, using a hashing algorithm. An encryptor at the first modem is programmed with a second key Id and said session key, and a decryptor at the second modem is programmed with the second key Id and the session key. Encryption is enabled at the first modem and information is transmitted in encrypted frames using the key represented by the second key Id. The encrypted frames are received at the second modem and the encrypted frames are decrypted when frames with the key represented by the second key Id are received.

A method of generating a new key for encrypted communication over a communication link between a first and a second modem, where each modem has a respective first and second master key. A first key material is generated for the first modem and a second of a plurality of pre-established key Id signals, each representing a respective key for use in encrypting at least a part of a frame of transmitted data, is selected. A frame of data that is encrypted using a key represented by a first key Id signal and contains a message that is encrypted using said first master key is transmitted, the message comprising the first key material and the second key Id signal, from the first modem to the second modem over the link. The first key material is received at the second modem and a second key material is generated. Then, session keys are generated at each of the first and second modems on the basis of the session keys. An encryptor at the first modem is programmed with a second key Id and the session key, and a decryptor at the second modem is programmed with the second key Id and the session key. Encryption at the first modem is switched to the second key Id and information is transmitted in encrypted frames using the second key Id. The encrypted frames are received at the second modem, and the received frames are decrypted using a key represented by the first key Id. Finally, there is switching to the key represented by the second key Id based upon receipt of a frame with the second key Id.

A method of secure transmission, from a first modem to a second modem over a communications link, of user information in a first channel that is represented by overhead information in a second channel. First, an encryption key is generated at a key manager. Then, content for a third channel containing at least one encryption key is generated. The content of the first channel, the second channel and the third channel are multiplexed to create a multiplexed output signal. Finally, the multiplexed output signal is encrypted, using the encryption key to generate an encrypted signal, and the encrypted signal is transmitted over the communications link.

Hardware in the form of a system or secure modem for implementing the foregoing methods.

DETAILED DESCRIPTION OF THE EXEMPLARY EMBODIMENTS

Figure 1A:
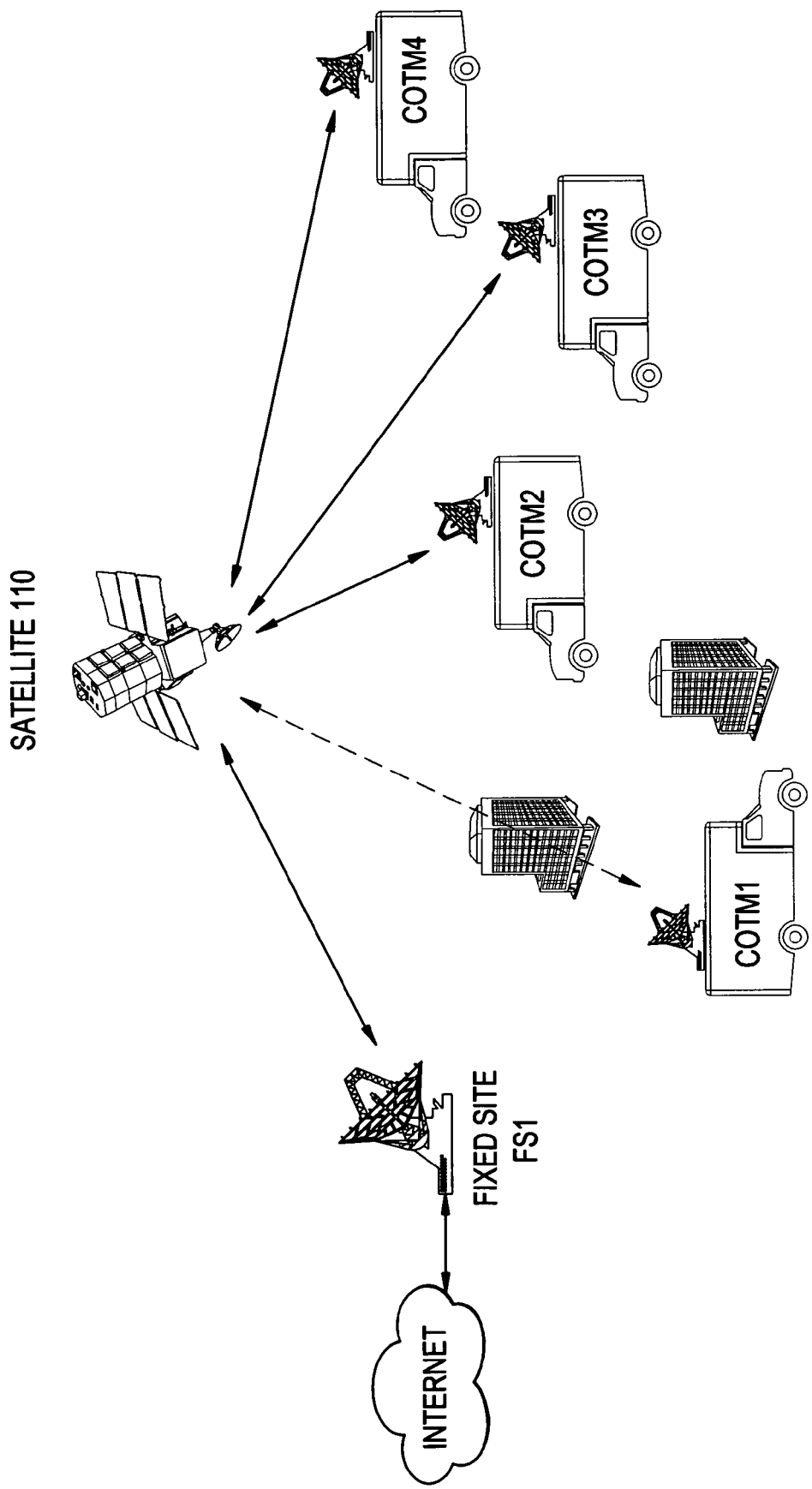
FIG. 1A is an exemplary illustration of a typical satellite based mobile system that may encounter interruptions and FIG. 1B is an illustration of a satellite communication system that may utilize the secure modem design and key management and rollover techniques of the present invention.

A conventional satellite-based mobile system is illustrated in FIG. 1A and shows a typical problem with interruption of signals when communication from a satellite 110 to any of a plurality of mobile terminals (COTM1-COTM4) may be blocked when a building exists in the line of sight between a mobile terminal and the satellite. In this manner, signals from the Internet that are fed to a fixed site FS1 for transmission via the satellite 110 to any one or more of the mobile terminals may be interrupted. Where the communications are to be encrypted and must be secure, it is important to accurately and efficiently establish a secure communication link and to reestablish the link in the event communications are temporarily blocked.

Figure 1B:
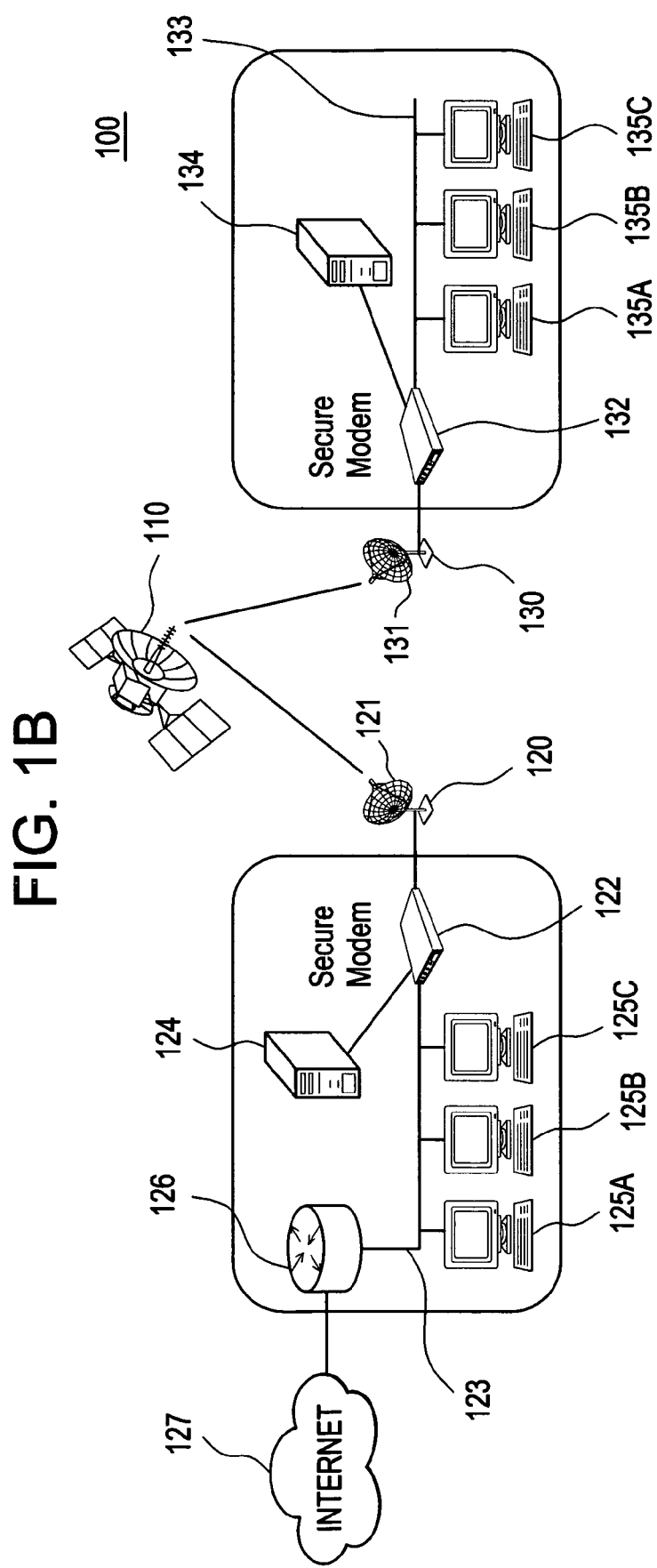

An exemplary embodiment of a system that may employ a secure modem-based communication is illustrated in FIG. 1B. The system 100 is based upon the use of a satellite 110 that provides uplink communication paths and downlink communication paths between two earth stations 120, 130 of conventional design, each having an antenna 121, 131 of appropriate size, shape and power, and being coupled to a secure modem 122, 132, respectively. As illustrated, each modem may be coupled to a LAN 123, 133, which is coupled to a controller 124, 134 provides local communication among a plurality of work stations 125A-125C, 135A-135C, respectively. Equivalently, modem 122 may be directly coupled to the network 127, typically through a router 126. At least one LAN 123 may be coupled, via router 126, to the Internet 127, using protocols and techniques well known in the art.

Figure 2:
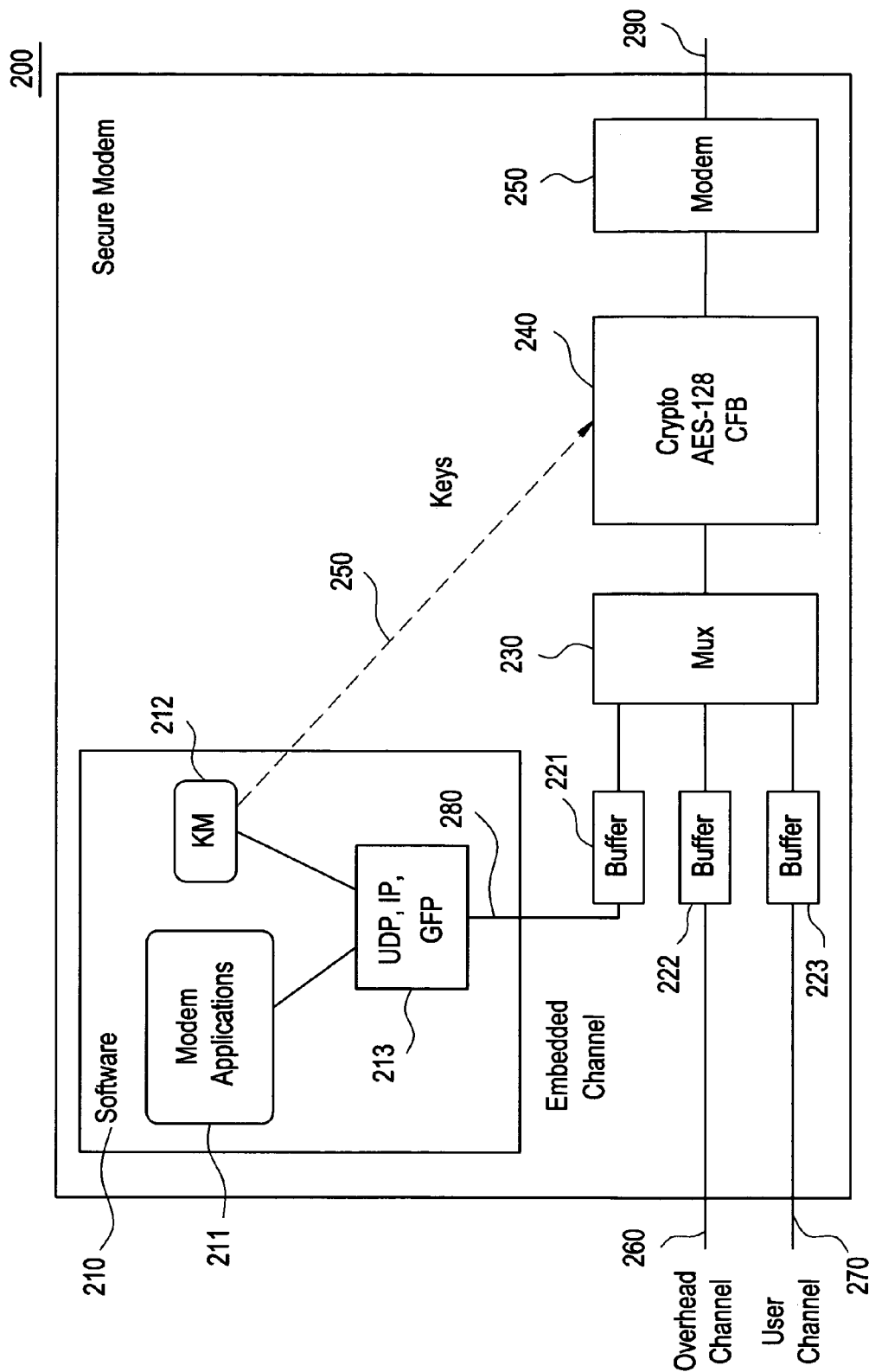
FIG. 2 is an illustration of a secure modem design in accordance with an exemplary embodiment of the present invention.

An illustration of the architecture of a secure modem 200, which is useable as modem 122, 132 in the system of FIG. 1 and implements the security features of the present invention, is illustrated in FIG. 2. The modem 200 would include conventional hardware components such as a CPU, memory, I/O and the like, as would be understood by one skilled in the art, which are not shown to preserve the simplicity of the drawing. As well, the hardware/software partitioning of the processing may vary based on implementation. The modem 200 includes a software package 210 that has a plurality of conventional modem applications 211 as well as a key manager 212, that serves to automatically establish keys asynchronously and on a random basis. The software applications 211 and key manager 212 are coupled to packaging software 213 that provides User-Datagram Protocol (UDP), Internet Protocol (IP) and Generalized Framing Protocol (GFP) formatting. The key manager directly supplies keys 250 to an encryption unit 240. The modem includes a plurality of buffers 221, 222, 223 that are coupled to a source of user data over a user channel 270 (buffer 223), overhead data from an overhead channel 260 (buffer 222), and the UDP, IP, GFP formulating information over the embedded channel 280 (buffer 221). The buffers 221A-223C are needed to store the overhead end data for purposes of obtaining timing and redundancy. The output of the buffers 221-223 is coupled to a multiplexer 230 that combines the different information streams into a single stream that is provided to a cryptographic module 240, which implements a commercial AES-128/CFB encryption processing. The module is a combination of hardware and firmware that receives keys from the key manager 212 and provides an "operate" signal that is an encrypted combination of the user channel information, overhead channel information and embedded channel information. That output is provided to modem 250 and transmitted on output 290. Notably, the embedded channel information originates from inside the modem and is not provided from an external source, such as the user.

Figure 3:
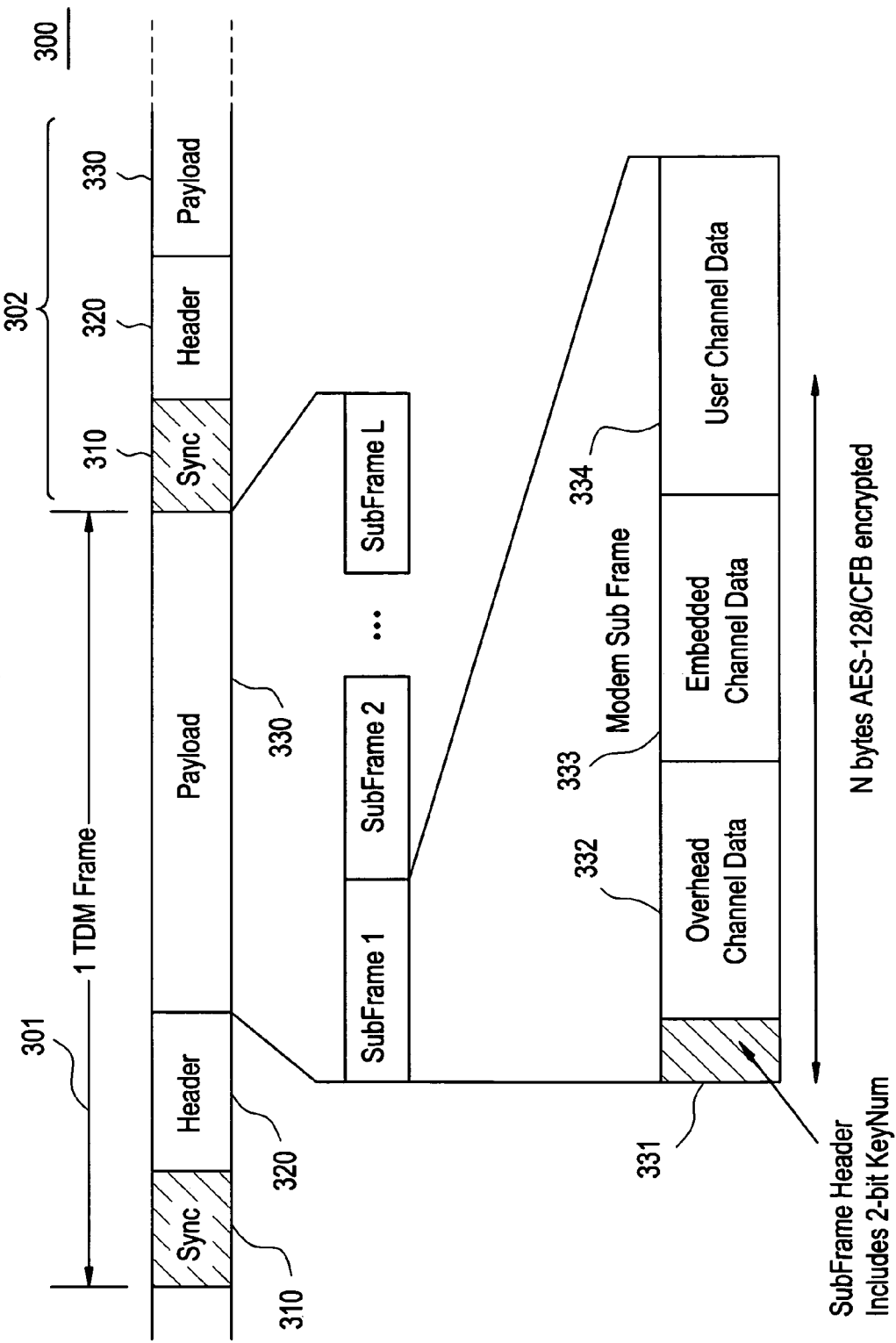
FIG. 3 is an illustration of a frame format that would be used in a continuous TDM transmission of information in accordance with the present invention.

The output of the exemplary modem 200 in FIG. 2 is a continuous transmission of signals from a variety of sources that are assembled into time division multiplexed (TDM) frames that are output onto line 290. With reference to FIG. 3, the output from a modem comprises a stream 300 of successive TDM frames 301, 302. FIG. 3 illustrates the format and content of one such TDM frame 301 that may be assembled according to an exemplary embodiment of the invention, it being understood that each successive frame preferably would have the same format for purposes of reliability and simplicity. The TDM frame 301 comprises a sync portion 310, header portion 320 and payload portion 330. These three portions appear in each of successive TDM frames. The sync portion 310 is used to establish timing synchronization between a transmitter and receiver, using a particular bit sequence. Techniques for use of sync words as such sequence are well know in the art. The header 320 has a variety of information that is useful for identifying the content of the TDM frame for purposes of reassembly at a receiver. For example, modulation and coding used in the payload can be provided on the basis of identified framing of the physical waveform. The payload 330, as illustrated in the figure, comprises a plurality of subframes 1-L, which preferably have a common size and contain information from each of the several channels, as explained subsequently. Details of an exemplary modem subframe are illustrated, and include a subframe header 331, which includes a 2-bit key number. The key number provides an identification of the characteristics of the content of the subframe. For example, but without limitation, a key number of zero may indicate that the subframe is not encrypted. In such case, the overhead and data channels would contain random data. A key number that equals 1, 2 or 3 may correspond to one of three different available keys that has been selected for use to encrypt the subframe.

More specifically, according to an exemplary embodiment of the invention, each modem 200 may have a choice of several keys for use in encrypting information input on various user and control channels. Further, as a matter of enhanced security, each modem may dynamically change the current key, as subsequently disclosed. The key number would serve to identify which key has been selected for use in encrypting a particular subframe.

The modem subframe also includes overhead channel data 332, which has been extracted from the overhead channel 260 in FIG. 2, which was input to the modem 200. The modem subframe further includes the embedded channel data segment 333, which may include information relating to the embedded channel that has been provided by the software module 210 in FIG. 2. Finally, the subframe includes user channel data 334, which had been extracted from the user channel 270.

The modem subframe comprises N bytes, and includes a combination of the subframe header 331, overhead channel data 332, embedded channel data 333 and user channel data 334. In an exemplary embodiment, all N bytes are encrypted according to the published Advanced Encryption Standard (AES), preferably the AES-128 standard operating in the cypher feedback mode (AES-128/CFB). Importantly, the entire combination of overhead channel data, embedded channel data and user channel data are encrypted. While the illustrated frame format in FIG. 3 suggests that the entire subframe content is encrypted, including subframe header 331 and the entire data channel 334, the subframe header 331 and a portion of the user channel data 334 need not be encrypted. The quantity of encrypted user data may be selected for system optimization, and partial encryption may be permitted. For example, adequate security would still be maintained, as where the user data may already have been encrypted. Moreover, economic considerations may dictate that less expensive modems, which do not have the capacity to encrypt the entire modem subframe, should be used. Thus, the number of N bytes may be less than the entire capacity of the subframe.

Indeed, the first N bytes of each subframe are encrypted and parts of the subframe header may not be encrypted. The number N is configurable, and may be less than or equal to the size of the subframe. In any event, given the assumption that the AES-128/CFB standard will be used, according to the exemplary embodiment, the number of bytes N would be a multiple of 16, having a content of 128 bits. However, as would be understood by those skilled in the art, the number of bytes need not be a multiple of 16. Moreover, as would be understood by those of ordinary skill in the art, a different arrangement would be possible given the use of a different encryption standard.

The limitation on the number N in the present exemplary embodiment is based upon the present requirements of the AES-128/CFB encryption algorithm that subframe data be broken into 16-byte blocks, PT[0], PT[1]. . . PT[M], where the designation "PT" refers to "plain text" blocks. The first M blocks get encrypted, where M equals N/16. Each block PT[n] is encrypted to create a cypher text block CT[n]. In such case, CT[n] is equal to PT[n] XOR KS[n]. In this case, KS[n] equals AES-Encrypt(CT[n−1], KEY). Here, certain bits of the key stream, as they appear in KS[0] are set to 0. These bits should at least cover the KeyNum field in the standard. In this encryption arrangement, CT[−1] is equal to CT[M−1] of the previous subframe. However, for the first subframe, CT[−1] is set to a random value.

Figure 4:
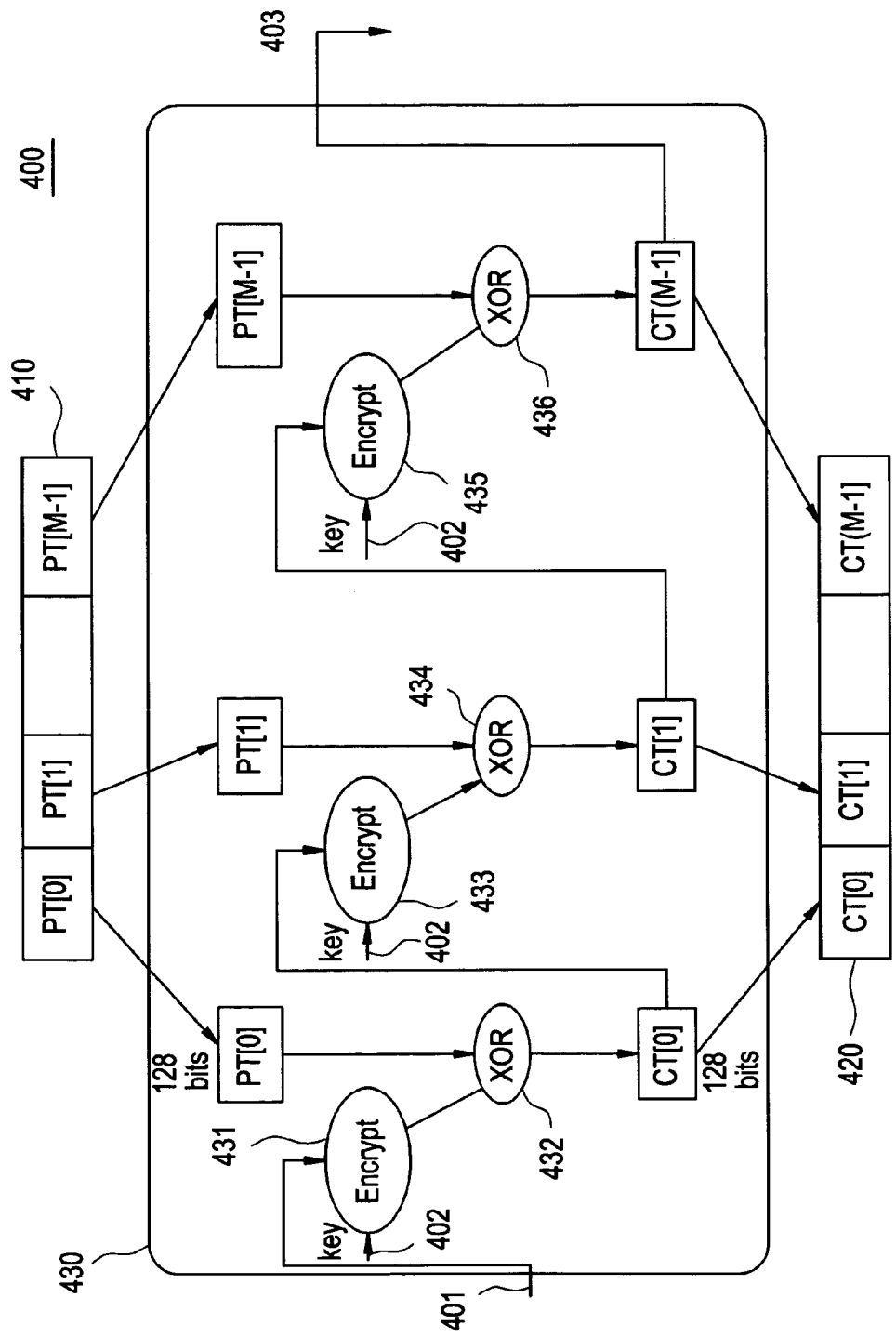
FIG. 4 is an illustration of an encryption processing that is useable with the present invention.

An illustration of an exemplary AES/CFB (cypher feedback mode) encryption operation is provided in FIG. 4. This encryption operation 400 is well-known and is based upon the conversion of plain text (PT) into cypher text (CT) using exclusive OR (XOR) operations. The exclusive OR processing is preferred since, in the course of providing a conversion from plain text to cypher text, it is easy to leave two bits (e.g., the subframe header 331) unencrypted. Each block (PT and CT) comprises 128 bits, according to the AES CFB standard. As illustrated in FIG. 4, a series 410 of plain text blocks pt[0]–pt[M−1] are converted to cypher text 420 in a form of blocks ct[0]–ct[M−1] on the basis of an input 401 and a key 402. The cypher text block ct[M−1] is output at 403 and is provided for use at the input 401 of the. encryption operation 400 for the next PT block of the next subframe. The cypher text input from the previous subframe 401 and the key 402 are processed by encryptor 431. The output of the encryptor 431 is provided to an exclusive OR 432, which also receives the 128 bits for plain text pt[0], to produce cypher text ct[0]. The cypher text ct[0] is input to a second encryptor 432, which also receives the key 402 and inputs to an exclusive OR 434 to produce a cypher text ct[1]. This chain proceeds to a final encryptor 435 that receives the key 402 and outputs to an exclusive OR 436, whose output is cypher text [M−1].

While the cypher text block [M−1] is provided at the output of each processing of a subframe to the input of the processing of a subsequent subframe, it should be noted that at the start, the input to the first subframe is created by a random generator and provided at line 401. The reason for using the prior cypher text block as an input to the encryption operation on a given subframe, as understood in the art, is that if PT[0] is all zeros and PT[1] is all zeros, a difference would not be possible. Therefore, use of the prior encrypted output of a previous subframe conveniently permits a difference to be obtained.

Figure 5:
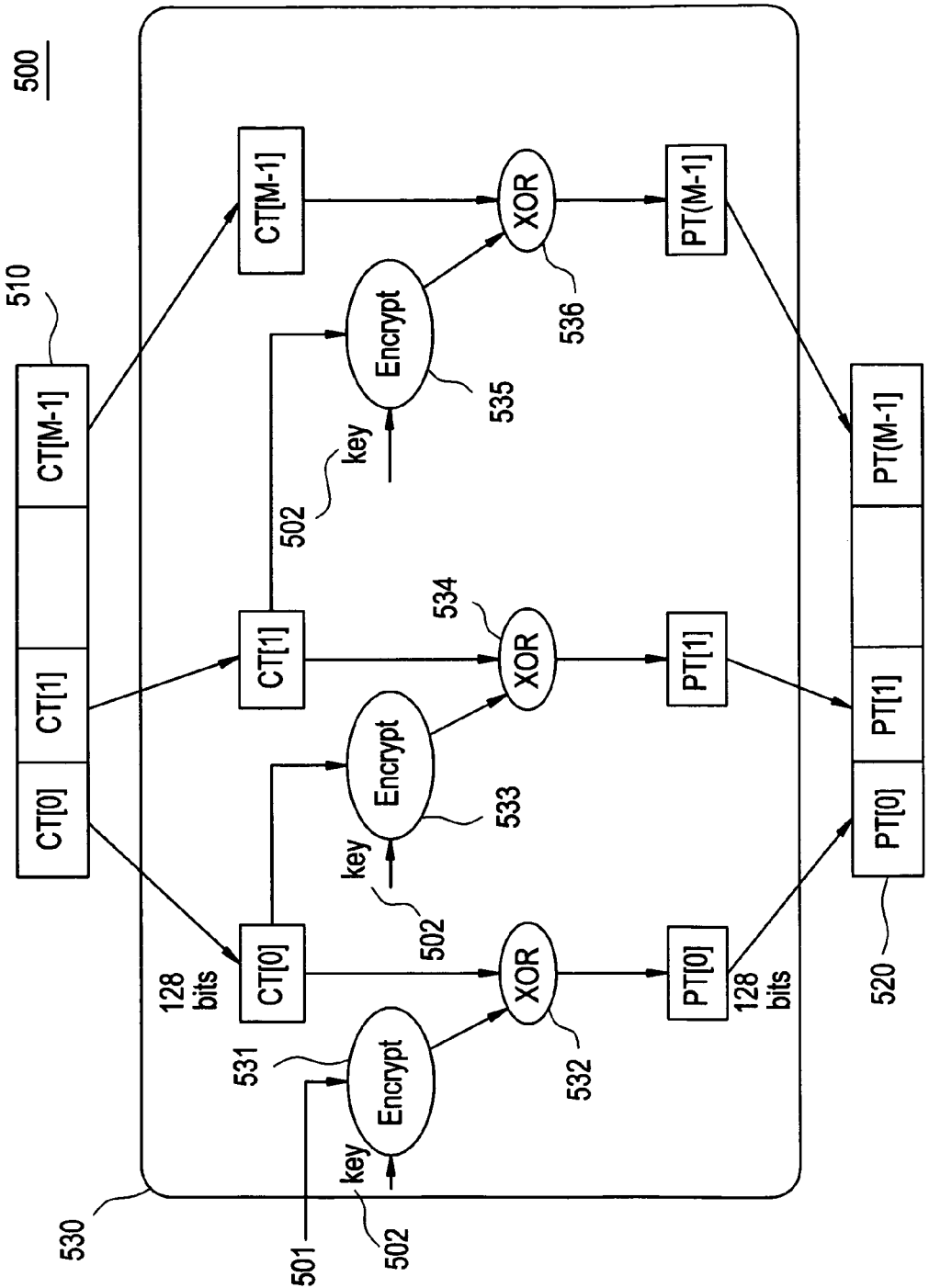
FIG. 5 is an illustration of a decryption processing that is useable with the present invention.

FIG. 5 illustrates the CFB decryption operation 500, which is similar in organization to the encryption operation of FIG. 4. The sequence 510 of cypher text blocks ct[0]–ct[M−1] are provided to the decryption processing 530 in order to produce a plain text message 520 having blocks pt[0]–pt[M−1]. The output from a previous decryption operation 501 is input to an encryption element 531 together with a key 502 and the output is provided to an XOR element 532, so that a cypher text block ct[0] is converted to a plain text block pt[0] of 128 bits. This process proceeds in a sequence of encryption elements 533, 535 and XOR elements 534, 536. Notably, there is no overhead in the conversion since 128 bits of text is converted directly to 128 bits of plain text. Importantly, given this arrangement, if one of the text blocks is corrupted, it is still possible to provide decoding of other blocks in the subframe, based upon the next correctly received text block. Thus, there is only a one block limit on error propagation in this decryption operation.

The application of the foregoing encryption and decryption operations to the modem processing of FIG. 2 offers significant advantages. First, this arrangement permits the encryption of all channels together, including embedded channel, overhead channel and user data channel, using one encryption engine. The key number in the subframe header, however, may be excluded and transmitted as plain text. Second, the arrangement offers strong security for all user and modem control data. Third, there is no extra overhead or delay due to the encryption processing. Fourth, the AES-CFB mode assures that identical plain text blocks will, in general, encrypt to different text values. This protects against playback attacks and prohibits snooping on controller traffic messages belonging to other terminals. Finally, as already noted, if a CT block is corrupted, then that block and the next block will be subject to errors, but the next block after that will not contain any errors. Thus, the effect of losses of data in problematic environments, particularly those involving mobile communications and satellite-based communications, is minimized. Thus, with the use of this arrangement in mobile applications, where transmission interruptions can cause a loss of clock or loss of sync, as soon as a good block or frame is found, the clock and sync are reestablished without the need for new keys and without any loss of state.

The effective establishment of an appropriate encryption key in order to permit secure communication between two modems, and the changing of the encryption key in a rollover process during communication are essential processes in a reliable secure system. The establishment of the encryption key may be required in either bi-directional or unidirectional communication systems. Similarly, key rollover may be required for both types of communication links.

Figure 6:
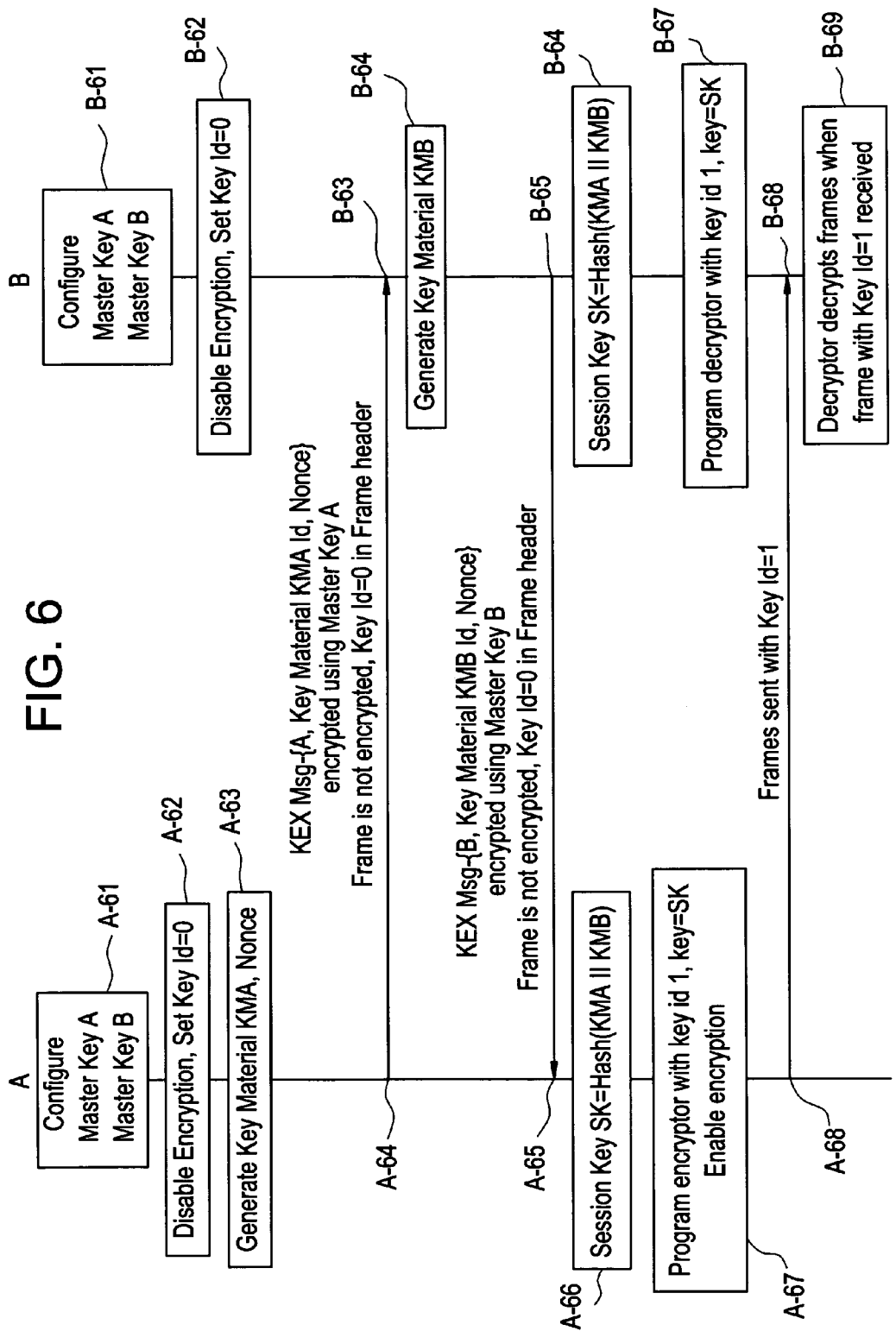
FIG. 6 is an illustration of a key management flow for bidirectional links between two modems, in accordance with an exemplary embodiment of the present invention.

The establishment of a key for bi-directional links is illustrated as a process in the flow chart of FIG. 6 for an exemplary embodiment having two communicating modems, Modem A and Modem B. The processing within each modem is arranged vertically in the figure, and the communication between modems is illustrated horizontally. In such system, each modem is configured with its own private master key together with the master key of all other authorized modems, as illustrated in steps A-61 and B-61. In this system, a user may optionally configure identical keys for all modems in a group. The master key serves as a password and is used only sparingly to establish a secure link. This is to be differentiated from a session key, which is used in current communications and is changed on the fly, as subsequently discussed.

Once the master keys are configured for the modems A and B that are communicating over the bi-directional link, the encryption is disabled and the key Id is set to zero at steps A-62 and B-62, respectively. The key Id remains at zero until a session key for communication is established, as subsequently described. Thereafter, the modem A at step A-63 will generate Key Material KMA that is used to establish a session key. The session key material is a 128-bit random bit-stream, which in the exemplary embodiment exists in an application layer and is not a key. Also, at the same time, modem A will establish an initial value for the component Nonce. As is known in the art, Nonce is a secret multi-byte value shared by encryptor and decryptor, and acts as an extension of the encryption key. At the initial step A-63, the Nonce field is filled with a 128 bit random number.

In step A-64, modem A acts as an initiating modem and generates and sends session key material KMA to modem B over the embedded channel. During this initialization phase, dummy overhead data and user data are sent together with the embedded channel data in the clear. The key number KN in the subframe header would be set to zero. Thus, only key exchange messages are sent over the embedded channel and multiplexed together with the overhead data and user data in dummy condition. Modem A's master key is used for the encryption process, which is accomplished using the standard AES-128-CTR or AES-128-CBC algorithms. In addition, at modem A, an algorithm is employed that tells whether the key exchange message is corrupted and is used for authentication. In this example, the well known Hashed Message Authentication Code (HMAC) is generated on the basis of the master key for modem A, using the standard AES-128-CCM or SHA-1 algorithm.

At modem A, the encrypted key initialization message KEX, which contains the Key Material KMA, key Id, and Nonce, all encrypted using Master Key A, is transmitted to modem B in step A-64. Again, the frame is not encrypted and the key Id equals zero in the subframe header. The transmitted message is received at modem B at step B-63. Upon receipt at modem B, a similar Key Message generating process is engaged.

On the basis of the received message from modem A, modem B will fetch a key from a local database, decrypt and authenticate the received message from modem A (not shown). On the basis of the extracted and fetched information, modem B then generates Key Material KMB at step B-64. In particular, modem B generates and sends session key material KMB to modem A over the embedded channel in step B-65, together with control data and user data having values of all zeros as a dummy signal. The session key material is again a 128-bit random bit string, the key Id is set to zero, and the key message KEX is software encrypted at the application layer. Modem B's master key is used for encryption and HMAC generation. The Nonce field is not freshly generated but is copied from the message from modem A, so that it may subsequently be used for verification of successful transmission.

As illustrated in FIG. 6, modem A will receive the transmission from modem B at step A-65 and will use the sender ID field in the received KEX message to fetch a key from a local database, decrypt and authenticate the received message and verify the Nonce field.

Figure 7:
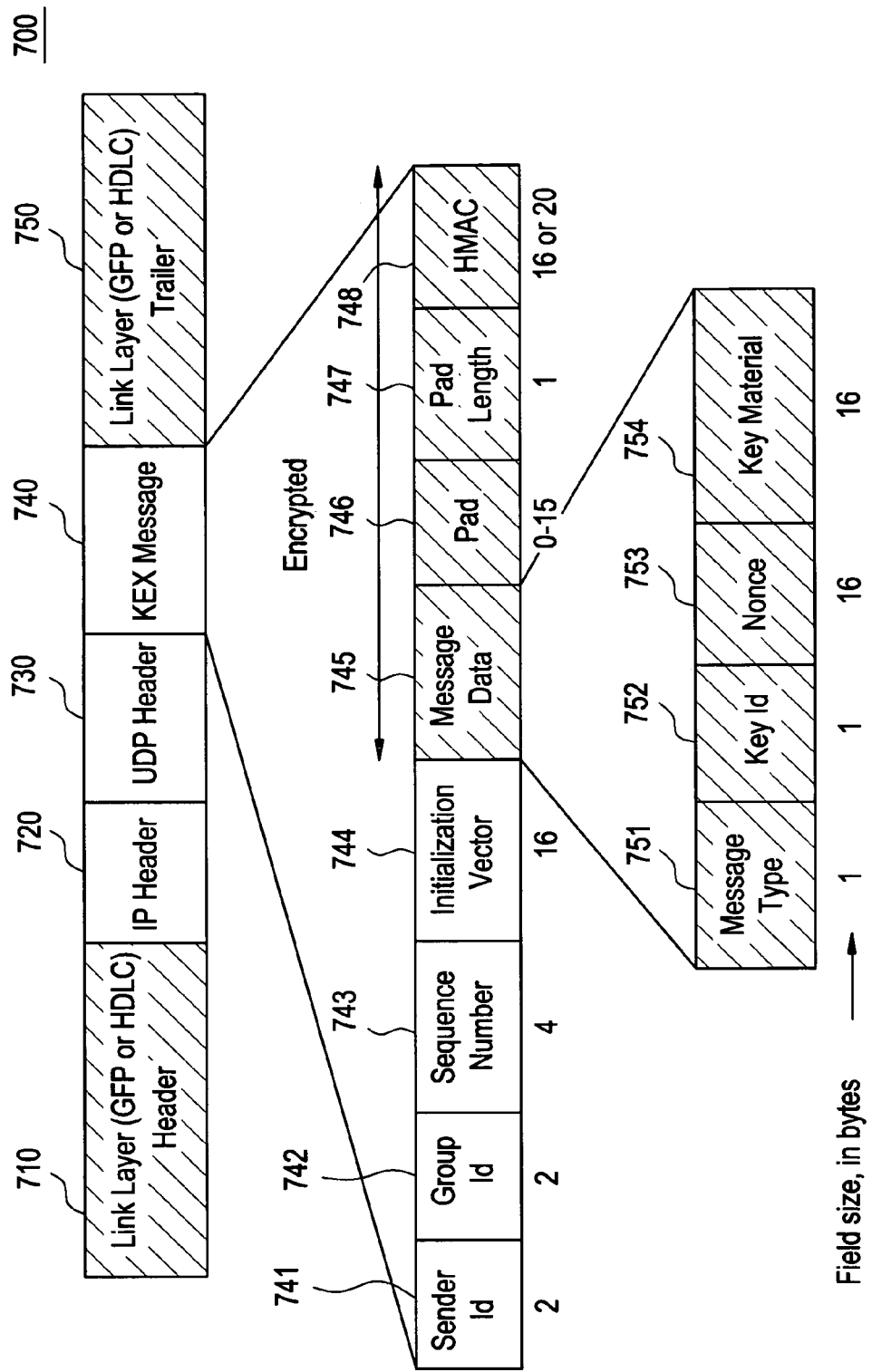
FIG. 7 is an illustration of a frame structure for a key management message useable in connection with an exemplary embodiment of the present invention.

Key exchange is implemented using a message format as illustrated in FIG. 7. The key management message format is used in both the establishment and rollover process, subsequently explained in connection with FIG. 9. There, in the first message format, 700, link layer (GFP or HDLC) header 710 followed by the IP header 720, UDP header 730, KM message 740 and linked layer (GFP or HDLC) trailer 750. The KEX message 740 comprises a number of separate identification or information data groups, including a 2-byte sender ID 741, a 2-byte group ID 742, a four byte sequence number 743, a 16-byte initialization vector 744, message data 745, a 0-15 byte pad 746 that acts as a filler, a 1 byte pad length indicator 747 and a 16 or 20 byte HMAC 748. Within the message data 745, the one-byte message type 751 is followed by a one-byte key ID 752, a 16-byte Nonce 753 and a 16-byte Key Material 754, where both the Nonce and Key Material are 128-bit numbers in accordance with the AES standard. As would be understood by those skilled in the art, different allocations of byte sizes and message format content may be used, as permitted by the particular encryption standard employed. Moreover, the link layer, network layer and transport layer headers are exemplary and other schemes can be used.

An important element in the frame 700 is the KM message 740. Only a part of that message may be encrypted and includes the message data 745, pad 746, pad length 747, and HMAC 748. In the case of the establishment of a key, the master key is the sender's own key since the receiver's key is not yet known. Within the message data, as previously noted, the Nonce is a random number that is sent back by the modem B to determine whether the correct number has been sent. This is used to verify by response that the key has been received. However, the invention is not limited to this type of transmission, and various modifications thereto would be apparent to those skilled in the art and are intended to be encompassed within the scope of the invention.

Referring back to FIG. 6, at this point, in each of modem A and modem B, a session key SK is established in steps A-66 and B-66, respectively.

Once the session encryption key SK is established, at step A-67 modem A enables its encryptor, using the session key SK and its key Id set to 1. At this point, overhead data and user data transmission are also enabled, and transmission of TDM frames from modem A to modem B, using the Key Id equal to 1, begins at step A-68.

At step B-67, modem B programs its receiver for decryption using the session key SK and key Id equal to 1 as well. At step B-68, modem B starts receiving frames sent by modem A with the key Id equal to 1 and begins decrypting subframe data at B-69 when it sees a non-zero key number in the received subframe header. Prior to this, during the establishment of synchronization, the key number would be zero.

Session key establishment for transmissions from modem B to modem A is independently done in a similar manner. In the exemplary but non-limiting embodiment used to explain the invention, the establishment of a session key in the modem A to modem B direction is set first, followed by the establishment of a session key for transmissions in the modem B to modem A direction. As would be understood by one skilled in the art, it is possible that decryption may get enabled in one direction before session key establishment for the other direction is complete.

As previously noted, the present invention is particularly applicable to mobile or satellite communications where interruption of a continuous communication is likely. Thus, if there is a loss of sync, an attempt at resync, and a failure to reestablish embedded channel communications for a configured amount of time, then the key initialization procedure over unencrypted channels is reexecuted. This ability to restore by self-synchronization is an important feature of the present invention.

Figure 8:
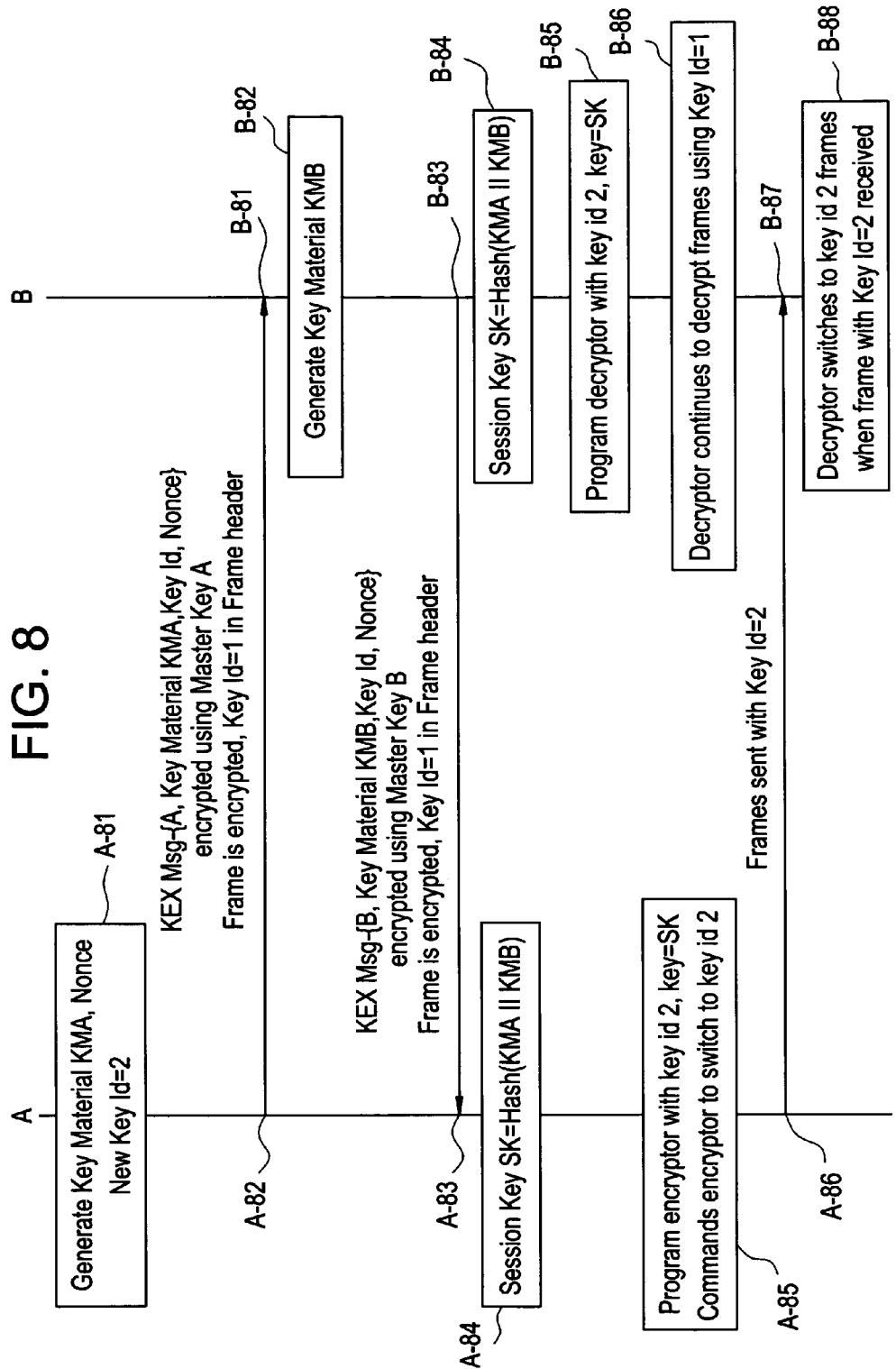
FIG. 8 is an illustration of a rollover technique that may be used to change session keys in a bidirectional communication environment in accordance with the present invention.

In addition to establishment of a key in a bidirectional communication environment, a periodic changing of the key for security purposes using a rollover technique is also important. Key rollover may be very similar to the key establishment procedure, however, encryption remains enabled during the rollover of a key message exchange. In the process as illustrated in FIG. 8, which has a ladder-type flow as in FIG. 6, modem A generates a new key material for the next numbered key (1, 2 or 3) every T minutes, where T is configurable. Key material is exchanged as before and sequence number of messages are incremented for each message transmitted. The receiver rejects messages with older sequence numbers.

In this regard, assuming that transmission has been successfully conducted using a given key Id (e.g., =1), modem A will generate Key Material KMA, Nonce and a new key Id (=2 in the example) at step A-81. Then, at step A-82, the KEX message, having the format illustrated in FIG. 7 and comprising Key Material KMA, key Id and Nonce, all encrypted using Master Key A, are transmitted to modem B. The frame is encrypted and the key Id=1 in the frame header. At step B-81, the KEX message is received at modem B and a Key material KMB is generated at step B-82. Then, at step B-83, a KEX message for modem B is transmitted to modem A, which comprises a key material KMB, key Id and Nonce encrypted using Master Key B. Again the frame is encrypted and key Id=1 in the frame header. The transmitted KEX message, having the format illustrated in FIG. 7, is received at step A-83.

At both modem A and modem B, a session Key SK is established using a hash function on KMA and KMB, as illustrated in steps A-84 and B-84, respectively. In step A-85, the encryptor (240 in FIG. 2) in modem A will switch to use of key Id=2 and the new session key SK, and at step A-86 will begin transmitting frames to modem B using that key Id and session key. At modem B, the receiver programs its decryptor with a new session key SK and a new key number at step B-85. Modem B decryptor has two keys at this point, key Id=1 and key Id=2. Modem B continues to decrypt frames using key Id=1 at step B-86. However, when modem B receives frames with key Id=2 from modem A at step B-87, modem B then has its decryptor switch to key Id=2 and deletes the older key and key number at step B-88. Thereafter, both modem A and modem B are programmed to use the same SK and same key Id, and will use that common information until a further rollover occurs. Notably, if a modem anytime sees an unexpected key number in the received subframe, it will continue to use its current decryption key and will not effect a change.

As with the establishment of keys in the modem A to modem B direction and the modem B to modem A directions, key rollover for the modem B to modem A direction is conducted independently.

While bi-directional communication between modem A and modem B is preferred, unidirectional links may also be established. In such case, session encryption keys can be pre-configured manually on both modems, both for initialization and ahead of time for rollover. The rollover can be performed by the transmitter at pre-determined times. Alternatively, key management and rollover can be established by a dynamic process, as subsequently explained.

Figure 9:
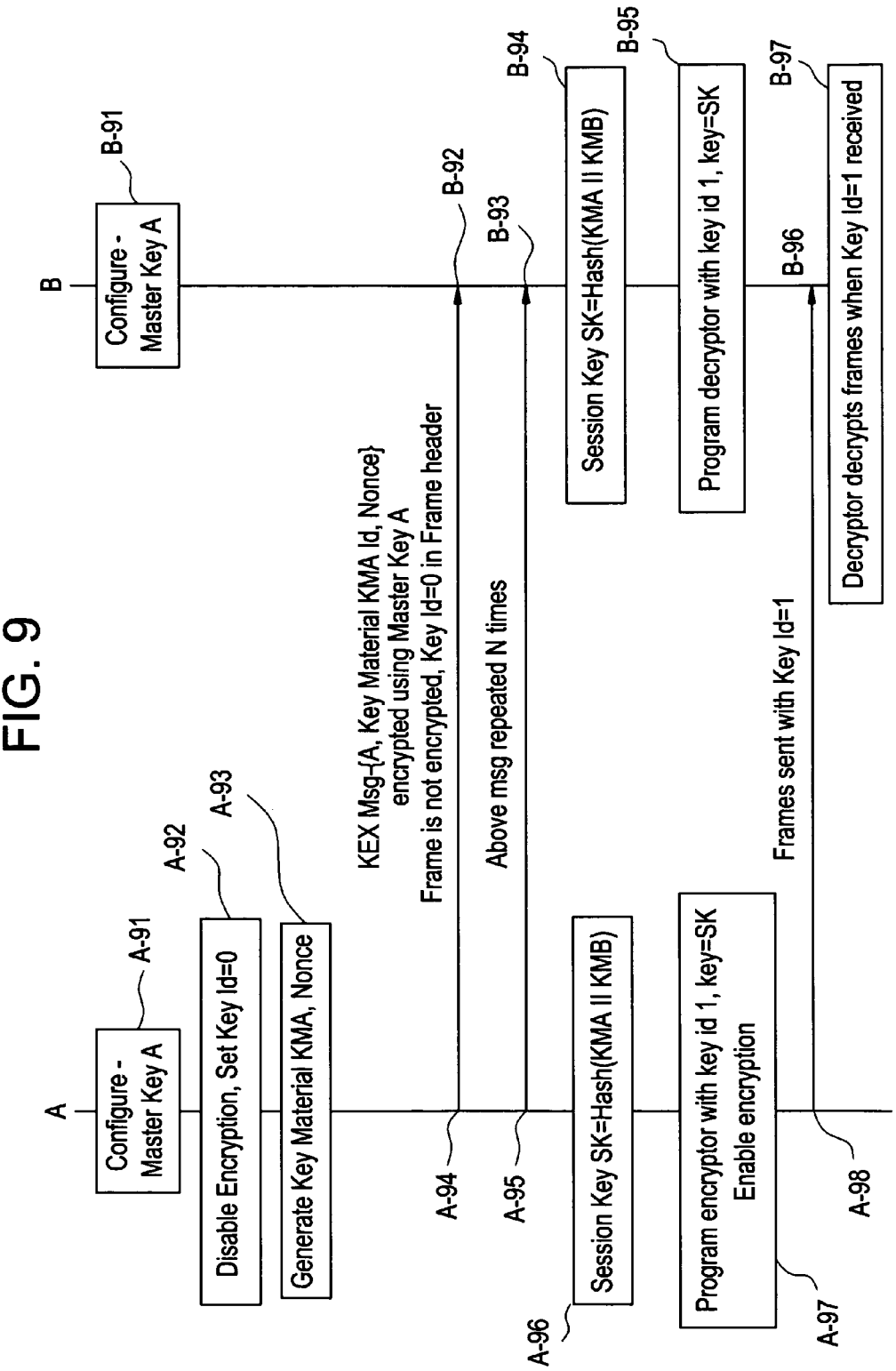
FIG. 9 is of a key management flow for a unidirectional link between two modems, in accordance with an exemplary. embodiment of the present invention.

With reference to FIG. 9, key management for uni-directional links in an exemplary modem A to modem B direction, can be undertaken by the illustrated dynamic process. In an initial step A-91 and B-91 in each of modem A and modem B, respectively, a master key A and B is configured. As previously noted, each modem is assigned a secret master key and each modem is configured with the master key of other modems with which it can communicate. At modem A, as the transmitting modem, encryption is disabled and the key Id is set to zero at step A-92. Then, Key Material KMA and Nonce is generated at step A-93. On the basis of the KMA and Nonce values, a KEX message comprising KMA, key Id and Nonce, is encrypted using master key A and transmitted at step A-94. The frame itself is not encrypted and the key Id is set equal to zero in the frame header. The above message is transmitted to modem B several times, as indicated by step A-95.

At modem B, the KEX message is received at steps B-92 and B-93. At both modems, on the basis of the generated and transmitted KMA, and a previously known KMB (a preconfigured constant that need not be not secure), a session key SK is generated locally using a hash function on KMA and KMB at steps A-96 and B-94, respectively.

Once the session key SK is known at modem A, the encryptor in the transmitter is programmed with key Id=1 and the key equal to the session key SK at step A-97. Thereafter, frames are sent from modem A to modem B using key Id=1 at step A-98.

At modem B, once the session key SK is known, the decryptor in the receiver will be programmed with a key Id=1 and a key equal to SK at step B-95. This enables the receiver to receive frames with key Id=1 at step B-96 and decrypt the frames when a key Id=1 is detected, at step B-97.

Figure 10:
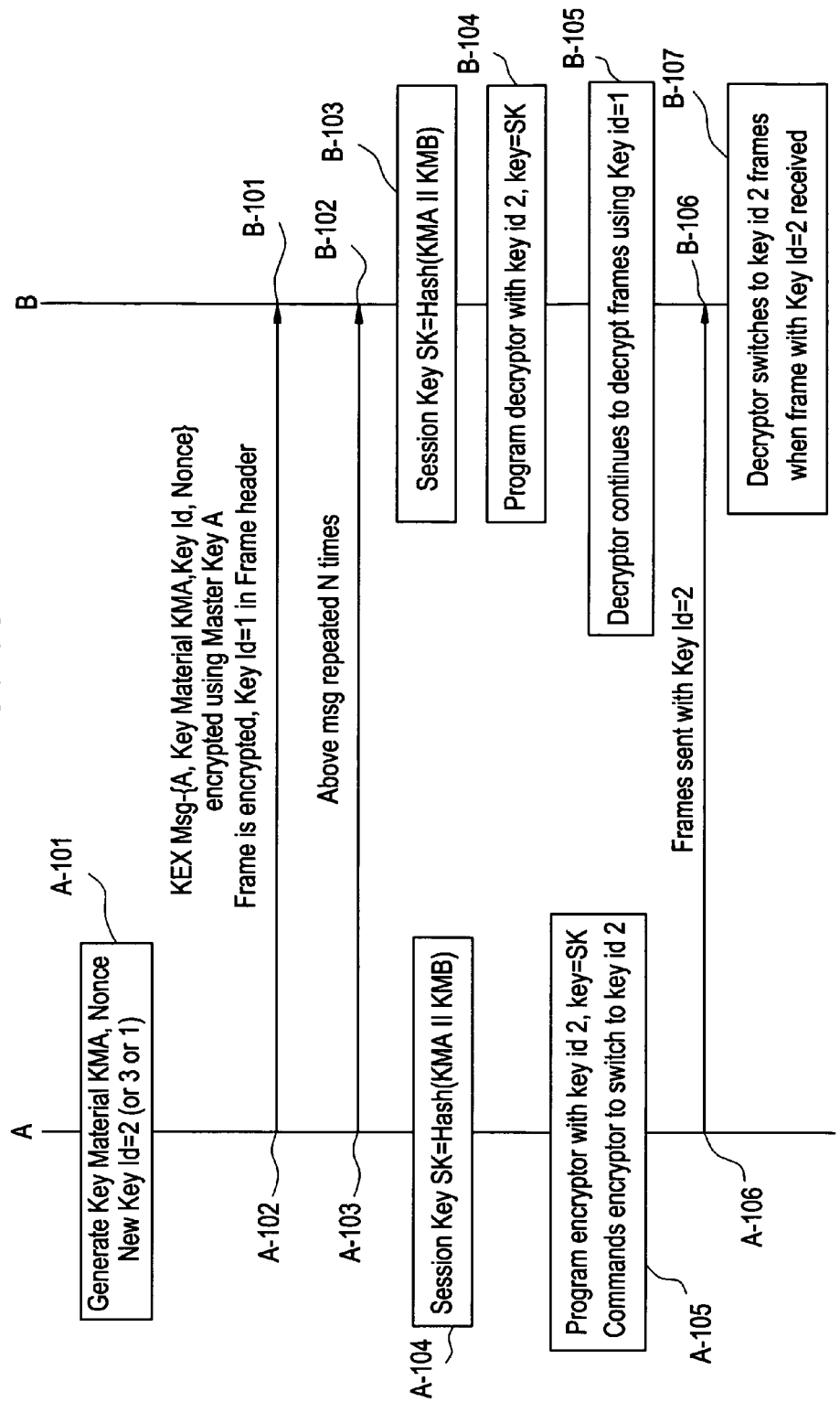
FIG. 10 is an illustration of a rollover technique that may be used to change session keys in a unidirectional communication environment in accordance with the present invention.

The dynamic rollover for unidirectional links is conducted in a similar manner, as illustrated in FIG. 10. In this regard, assuming that transmission has been successfully conducted using a given key Id (e.g., =1), modem A will generate Key Material KMA, Nonce and a new key Id (=2 in the example) at step A-101. Then, at step A-102, the KEX message, having the format illustrated in FIG. 7 and comprising Key Material KMA, key Id and Nonce, all encrypted using Master key A, are transmitted to modem B. The frame is encrypted and the Key Id=1 in the frame header. The transmission is repeated N times, as indicated by step A-103. At steps B-101 and B-102, the KEX messages are received at modem B.

At both modem A and modem B, a session Key SK is established using a hash function on KMA and KMB, as illustrated in steps A-104 and B-103, respectively. In step A-105, the encryptor (240 in FIG. 2) in modem A will switch to use of key Id=2 and the new session key SK, and at step A-106 will begin transmitting frames to modem B using that key Id and session key. At modem B, the receiver programs its decryptor with a new session key SK and a new key number at step B-104. Modem B decryptor has two keys at this point, key Id=1 and key Id=2. Modem B continues to decrypt frames using key Id=1 at step B-105. However, when modem B receives frames with key Id=2 from modem A at step B-106, modem B then has its decryptor switch to key Id=2 and deletes the older key and key number in step B-107. Thereafter, both modem A and modem B are programmed to use the same SK and same key Id, and will use that common information until a further rollover occurs.

Again, session encryption keys can be configured manually on both modems ahead of time for rollover. Rollover can be performed by the transmitter in a unidirectional mode at pre-configured times.

While the foregoing key exchange technique has been described and represents one exemplary embodiment, other well-known ways to perform key exchange and authentication, which include those based on Diffie-Hellman, elliptical curve cryptography and RSA, may be applied.

Other advantages include the ability to implement the underlying AES firmware as a small hardware item. The encrypter is a simple, in-line, stream-oriented encrypter. The firmware requires AES-128 encryption logic only, replicated twice, with no decryption logic. Further, the AES firmware need deal with only a single AES session and key combination.

While the foregoing description is directed to certain exemplary embodiments, the invention disclosed herein is not limited thereto, but is to be defined by the appended claims.

What is claimed is:

1. A method of establishing a key for encrypted communication over a communication link between a first and a second modem, each modem having a respective first and second master key, comprising:
   disabling frame encryption and setting a key Id to a first value;
   generating a first key material for said first modem;
   transmitting a first message that is encrypted using said first master key, said first message comprising said first key material, from said first modem to said second modem via an unencrypted first frame over said communication link, wherein said first master key is known to the first modem and the second modem prior to the transmitting step;
   receiving said first key material at said second modem and generating a second key material;
   at said second modem, after said step of receiving said first key material, sending a second frame including a second message comprising said second key material encrypted using said second master key, to said first modem over said communication link without encrypting said second frame, wherein said second master key is known to the first modem and the second modem prior to the transmitting step;
   generating session keys at each of said first and second modems based on the first key material and the second key material;
   programming an encryptor at said first modem with a second key Id and said session key, and programming a decryptor at said second modem with said second key Id and said session key;
   enabling encryption at said first modem by the encryptor using the second key Id to generate encrypted frames, the encrypted frames including the second key ID, and transmitting information in the encrypted frames to the second modem, and
   receiving said encrypted frames at said second modem and decrypting said encrypted frames using the decryptor when frames including said second key Id are received.

2. The method of establishing a key for encrypted communication, as set forth in claim 1, wherein said step of generating session keys comprises processing said first key material and said second key material together.

3. The method of establishing a key for encrypted communication, as set forth in claim 2, wherein said processing comprises hashing said first and second key materials.

4. The method of establishing a key for encrypted communication, as set forth in claim 1, wherein said generating step the first key material further comprises generating a Nonce signal and said transmitting step comprises transmitting said Nonce signal with said first key material.

5. The method of establishing a key for encrypted communication, as set forth in claim 1, further comprising:
   pre-establishing a plurality of key ID signals, at least one key ID signal indicating at least a part of a frame is not encrypted and at least two key ID signals identifying a key used for encrypting at least a part of a frame of transmitted data, and
   assigning one of said plurality of key Id signals to transmitted data, wherein, said step of transmitting the first message comprising the first key material further comprises transmitting said assigned key Id signal.

6. The method of establishing a key for encrypted communication, as set forth in claim 5, wherein said assigned key Id signal is transmitted in a header of at least a part of an information frame.

7. The method of establishing a key for encrypted communication, as set forth in claim 6, wherein said information frame comprises a plurality of sub frames, each subframe having header containing said assigned key Id signal.

8. The method of establishing a key for encrypted communication, as set forth in claim 1, wherein a plurality of modems are in a group and all of said modems are assigned a common master key, said common master key being used for encrypting the transmitted message from any modem in said group.

9. A method of generating a new key for encrypted communication over a communication link between a first and a second modem, each modem having a respective first and second master key, comprising:
  generating a first key material for said first modem and selecting a second key Id signal among a plurality of pre-established key Id signals, each representing a respective key for use in encrypting at least a part of a frame of transmitted data,
  transmitting a first frame of data that is encrypted using a key represented by a first key Id signal and contains a message that is encrypted using said first master key, said message comprising said first key material and said second key Id signal, from said first modem to said second modem over said communication link, wherein the first master key and the second master key are known to the first modem and the second modem prior to the transmitting,
  receiving said first key material at said second modem and generating a second key material;
  at said second modem, after said step of receiving said first key material, sending said second key material and said second key Id encrypted using said second master key, to said first modem over said communication link using the key corresponding to said first key Id;
  generating session keys at each of said first and second modems based on the first key material and the second key material, said session keys represented by the second key Id;
  programming an encryptor at said first modem with the second key Id and said session key, and programming a decryptor at said second modem with said second key Id and said session key;
  commanding encryption by said encryptor at said first modem to switch to said second key Id and transmitting information in encrypted frames using said second key Id;
  receiving said encrypted frames at said second modem, decrypting said received frames using the key represented by said first key Id; and
  switching, at the second modem, to the session key represented by said second key Id based upon receipt of a frame with said second key Id.

10. The method of generating a new key for encrypted communication, as set forth in claim 9, further comprising, wherein said generating step further comprises generating a Nonce signal and said transmitting step comprises transmitting said Nonce signal encrypted using said first master key together with said first key material.

11. The method of generating a new key for encrypted communication, as set forth in claim 9, wherein said step of generating session keys comprises processing said first key material and said second key material together.

12. The method of generating a new key for encrypted communication, as set forth in claim 11, wherein said processing comprises hashing said first and second key materials.

13. A method of secure transmission, from a first modem to a second modem over a communications link, the method comprising:
  disabling frame encryption and setting a key Id to a first value;
  generating a first key material at a key manager for said first modem;
  creating a message containing said first key material, and encrypting the message using a master key, wherein said master key is known to the first modem and the second modem in advance;
  transmitting the encrypted message from said first modem to said second modem a plurality of times via an unencrypted first frame over said communication link;
  after transmitting the encrypted first message the plurality of times, generating session keys at each of said first and second modems based on the first key material and a predetermined second key material;
  programming an encryptor at said first modem with a second key Id and said session key, and programming a decryptor at said second modem with said second key Id and said session key, wherein the second key Id uniquely identifies the session key;
  encrypting transmission frames using said session key to generate an encrypted signal, the transmission frames including the second key Id;
  transmitting said encrypted transmission frames over said communications link to the second modem; and
  receiving said encrypted transmission frames at said second modem and decrypting said encrypted frames using the session key when frames including said second key Id are received.

14. The method of secure transmission as recited in claim 13, further comprising:
  combining at least one of UDP, IP and GFP formatting with said session key to create said encrypted transmission frames.

15. A secure modem, adapted to transmit encrypted information to a second modem over a communications link, comprising:
  means for disabling key encryption in the secure modem and setting a key Id to a first value;
  means for generating a first key material at a key manager;
  an encryptor operative to encrypt a first message using a first master key, the first message comprising said first key material, wherein the first master key is known to said secure modem and said second modem in advance;
  a transmitter for transmitting a first frame including said encrypted first message over said communications link to the second modem, wherein the first frame is unencrypted;
  a receiver which receives a second frame comprising an encrypted second message from the second modem, the second message encrypted using a second master key and the second message comprising a second key material, wherein the second modem generates the second key material in response to receiving the first key material in the encrypted first message, and the second message is encrypted using a second master key known to the secure modem and the second modem in advance;

wherein the means for generating generates a session key based on the first key material and the second key material, wherein the encryptor, after the generation of the session key, is programmed with a second key Id and said session key, and a decryptor at said second modem is programmed with said second key Id and said session key; and the encryptor encrypts frames using the session key to generate encrypted frames, the encrypted frames including the second key Id, and the second key Id uniquely identifies the session key, wherein the transmitter transmits the encrypted frames to the second modem, and the second modem, upon receiving frames including said second key Id, decrypts said encrypted frames using the decryptor.

16. The secure modem as recited in claim 15, further comprising a source of at least one of UDP, IP and GFP formatting and means for combining said formatting with said session key to generate said encrypted frames.

* * * * *